(12) United States Patent
Brown et al.

(10) Patent No.: US 9,251,253 B2
(45) Date of Patent: Feb. 2, 2016

(54) EXPEDITIOUS CITATION INDEXING

(71) Applicant: QUALCOMM Incorporated, San Diego, CA (US)

(72) Inventors: Craig M. Brown, Harbond (AU); Michael William Paddon, Tokyo (JP); Guy Perry, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 13/734,953

(22) Filed: Jan. 5, 2013

(65) Prior Publication Data
US 2014/0195540 A1 Jul. 10, 2014

(51) Int. Cl.
*G06F 17/30* (2006.01)

(52) U.S. Cl.
CPC ................................ *G06F 17/30728* (2013.01)

(58) Field of Classification Search
USPC ......... 707/710, 715, 726, 729, 738, 739, 757, 707/767, 771, 782, 923, 931, 933, 748, 749, 707/750, 711, 740, 741; 715/205, 206, 209, 715/234, 243, 246, 266, 277
See application file for complete search history.

(56) References Cited

U.S. PATENT DOCUMENTS

| | | | |
|---|---|---|---|
| 5,991,751 A * | 11/1999 | Rivette et al. | |
| 6,182,091 B1 * | 1/2001 | Pitkow et al. | 715/206 |
| 6,289,342 B1 * | 9/2001 | Lawrence et al. | |
| 6,295,542 B1 * | 9/2001 | Corbin | 715/205 |
| 6,457,028 B1 * | 9/2002 | Pitkow et al. | 715/206 |
| 7,720,989 B2 | 5/2010 | Dunk | |
| 7,774,007 B2 | 8/2010 | Backholm et al. | |
| 7,881,318 B2 | 2/2011 | Herzog et al. | |
| 7,904,453 B2 | 3/2011 | Poltorak | |
| 8,023,441 B2 | 9/2011 | Werb et al. | |
| 8,065,307 B2 | 11/2011 | Haslam et al. | |
| 8,522,061 B2 | 8/2013 | Hebron et al. | |
| 2003/0128676 A1 | 7/2003 | Lee | |
| 2004/0073531 A1 * | 4/2004 | Patterson | 707/1 |
| 2005/0071743 A1 * | 3/2005 | Harrington et al. | 715/500 |
| 2005/0210008 A1 | 9/2005 | Tran et al. | |

(Continued)

OTHER PUBLICATIONS

Pantelidou A, "On the BSS Max Idle Period 11-12-0376-01-00ah-on-the-bss-max-idle-period", IEEE SA MENTOR; 11-12-0376-01-OOAH-ON-THE-BSS-MAX-IDLE-PERIOD, IEEE-SA MENTOR, PISCATAWAY, NJ USA, vol. 802.11ah, No. 1, Mar. 13, 2012, pp. 1-13, XP068038734, [retrieved on Mar. 13, 2012] Slides 2-4, Slides 6-8.

Wang L, "Consideration on Max Idle Period extension for 11ah power save ; 11-12-0069-02-00ah-consideration-on-max-idle-period-extension-for-11ah-power-save", IEEE SA MENTOR; 11-12-0069-02-00AH-CONSIDERATION-ON-MAX-IDLE-PERIOD-EXTENSION-FOR-11AH-POWER-SAVE, IEEE-SA MENTOR, PISCATAWAY, NJ USA, vol. 802.11ah, No. 2, Jan. 19, 2012, pp. 1-14, XP068038150, [retrieved on Jan. 19, 2012] Slides 4-8.

(Continued)

*Primary Examiner* — Greta Robinson
(74) *Attorney, Agent, or Firm* — Charles E. Eggers

(57) ABSTRACT

Methods and systems for indexing patent related prior art citations are disclosed. Electronic documents can be obtained from one or more patent information systems. An OCR process can be performed on some of the electronic documents. Citations within the documents can be identified and compared to a trusted records list. The citations can be associated with one or more predetermined categories. For example, citations can be categorized into groups such as when a reference is cited (e.g., with original filing, pre and post allowance), who provided the reference (e.g., cited by the applicant, or the examiner), and how the reference is characterized (e.g., statutory basis, combination of references). The citations and corresponding categories can be output to a user or made available for subsequent processing.

12 Claims, 8 Drawing Sheets

(56) References Cited

U.S. PATENT DOCUMENTS

| | | | | |
|---|---|---|---|---|
| 2006/0248055 | A1* | 11/2006 | Haslam et al. | 707/3 |
| 2007/0073748 | A1* | 3/2007 | Barney | 707/101 |
| 2007/0250495 | A1* | 10/2007 | Belinsky et al. | 707/5 |
| 2008/0256435 | A1* | 10/2008 | Gottlieb et al. | 715/234 |
| 2009/0055721 | A1 | 2/2009 | Kahn | |
| 2009/0252072 | A1 | 10/2009 | Lind et al. | |
| 2010/0061272 | A1 | 3/2010 | Veillette | |
| 2010/0284316 | A1 | 11/2010 | Sampathkumar | |
| 2011/0201364 | A1 | 8/2011 | Capuozzo et al. | |
| 2013/0286909 | A1 | 10/2013 | Panneerselvam et al. | |

OTHER PUBLICATIONS

Cunningham H., et al., "Automatic Extraction and Resolution of Bibliographical References in Patent Documents", May 31, 2010, ADVANCES IN MULTIDISCIPLINARY RETRIEVAL, SPRINGER BERLIN HEIDELBERG, BERLIN, HEIDELBERG, pp. 120-135, XP019142238, ISBN: 978-3-642-13083-0 abstract sections 1 and 2.

International Search Report and Written Opinion—PCT/US2013/077072—ISA/EPO—Aug. 25, 2014.

\* cited by examiner

| | | | |
|---|---|---|---|
| (12) | United States Patent<br>Rose et al. | (10) Patent No.:<br>(45) Date of Patent: | US 8,229,118 B2<br>Jul. 24, 2012 |

(54) METHOD AND APPARATUS FOR AUTHENTICATION IN WIRELESS COMMUNICATIONS

(75) Inventors: Gregory G. Rose, Concord (AU);
Michael Paddon, Kellyville (AU);
Philip M. Hawkes, Burwood (AU);
James F. Semple, London (GB)

(73) Assignee: QUALCOMM Incorporated, San Diego, CA (US)

( * ) Notice: Subject to any disclaimer, the term of this patent is extended or adjusted under 35 U.S.C. 154(b) by 1633 days.

(21) Appl. No.: 10/944,155

(22) Filed: Sep. 16, 2004

(65) Prior Publication Data

US 2005/0100165 A1    May 12, 2005

Related U.S. Application Data

(60) Provisional application No. 60/518,041, filed on Nov. 7, 2003.

(51) Int. Cl.
*H04K 1/00* (2006.01)

(52) U.S. Cl. .................. 380/247; 380/270; 380/44

(58) Field of Classification Search ............. 380/46, 380/247, 270, 44; 713/171
See application file for complete search history.

(56) References Cited

U.S. PATENT DOCUMENTS

| | | | | |
|---|---|---|---|---|
| 5,371,794 A | * | 12/1994 | Diffie et al. | 713/156 |
| 5,455,863 A | * | 10/1995 | Brown et al. | 380/247 |
| 5,602,915 A | * | 2/1997 | Campana et al. | 380/277 |
| 5,602,917 A | * | 2/1997 | Mueller | 380/284 |
| 5,689,563 A | * | 11/1997 | Brown et al. | 380/247 |
| 5,809,140 A | * | 9/1998 | Rubin et al. | 380/279 |
| 5,915,021 A | * | 6/1999 | Herlin et al. | 705/67 |
| 6,023,689 A | * | 2/2000 | Herlin et al. | 705/67 |
| 6,580,906 B2 | * | 6/2003 | Bilgic et al. | 455/422.1 |
| 6,584,310 B1 | * | 6/2003 | Berenzweig | 455/432.1 |
| 6,591,364 B1 | * | 7/2003 | Parel | 713/170 |
| 6,711,400 B1 | * | 3/2004 | Aura | 455/411 |
| 6,769,060 B1 | * | 7/2004 | Dent et al. | 713/168 |
| 6,857,075 B2 | * | 2/2005 | Patel | 713/171 |
| 7,065,340 B1 | * | 6/2006 | Einola et al. | 455/410 |
| 7,096,494 B1 | * | 8/2006 | Chea | 726/9 |
| 7,107,620 B2 | * | 9/2006 | Haverinen et al. | 726/29 |
| 7,158,777 B2 | * | 1/2007 | Lee et al. | 455/411 |
| 7,181,196 B2 | * | 2/2007 | Patel | 455/411 |

(Continued)

FOREIGN PATENT DOCUMENTS

EP    0506637    9/1992

(Continued)

OTHER PUBLICATIONS

"A precis of the new attacks on GSM encryption" by Greg Rose, QUALCOMM Australia, Sep. 10, 2003 pp. 1-3.

(Continued)

Primary Examiner — David Garcia Cervetti
(74) Attorney, Agent, or Firm — Kristine U. Ekwueme

(57) ABSTRACT

Systems and methods of securing wirelss communications between a network and a subscriber station include inserting a marker denoting an encryption type within a random value used for authentication, calculating a first session key and a first response value as a function of the random value, then calculating a second session key and a second response value as a function of the random value, first session key and first response value. The two levels of session keys and response values may be used by upgraded subscriber stations and network access points to prevent attackers from intercepting authentication triplets.

36 Claims, 7 Drawing Sheets

FIG. 1
PRIOR ART

Sheet_1_of_1

| FORM PTO-1449 U.S. DEPARTMENT OF COMMERCE (REV. 7-80) PATENT AND TRADEMARK OFFICE | ATTY. DOCKET NO. 040082 | APPLICATION NO. Unknown |
|---|---|---|
| INFORMATION DISCLOSURE STATEMENT BY APPLICANT (Use several sheets if necessary) | APPLICANT ROSE et al. | |
| DATE MAILED: 9/16/2004 | FILING DATE Herewith | GROUP Unknown |

U.S. PATENT DOCUMENTS

| EXAMINER INITIAL | Ref No | DOCUMENT NUMBER | DATE | NAME | CLASS | SUB CLASS | FILING DATE IF APPROPRIATE |
|---|---|---|---|---|---|---|---|
| | A1 | | | | | | |
| | A2 | | | | | | |
| | A3 | | | | | | |

FOREIGN PATENT DOCUMENTS

| EXAMINER INITIAL | Ref No | DOCUMENT NUMBER | DATE | COUNTRY | NAME | CLASS | SUB CLASS |
|---|---|---|---|---|---|---|---|
| /DGC/ | B1 | 1005244A1 | 11/25/1998 | EP | ICO Services Ltd. (GB) | | |
| /DGC/ | B2 | 01/89253A1 | 11/22/2001 | WO | ICO Services Ltd. (GB) | | |

OTHER PRIOR ART (Including Author, Title, Date, Pertinent Page, Etc.)

| /DGC/ | C1 | "A precis of the new attacks on GSM encryption" by Greg Rose, QUALCOMM Australia, 10 September 2003, pgs. 1-3. |
|---|---|---|
| /DGC/ | C2 | "Enhancements to GSM/UMTS AKA" Ericsson, Document for Discussion, 3GPP TSG SA WG3 Security, S3-030542, Povoa de Varzim, Portugal, 6 - 10 October 2003, pgs. 1-3. |
| /DGC/ | C3 | H. Krawczyk et al. "Keyed-Hashing for Message Authentication" Network Working Group. Informational, rfc2104 HMAC, February 1997, pgs. 1-10. |
| /DGC/ | C4 | "SECURE HASH STANDARD" Federal Information Processing Standards Publication 180-2, August 1, 2002, pgs. i-iv. 1-71. |
| /DGC/ | C5 | "Further development of the Special RAND mechanism" Orange, Vodafone, Document for Discussion/Decision, 3GPP TSG SA WG3 (Security) meeting #30, S3-030588, Povoa de Varzim, Portugal, 7-10 October 2003, pgs. 1-4. |
| /DGC/ | C6 | Elad Barkan et al. *Instant Ciphertext-Only Cryptanalysis of GSM Encrypted Communication" Computer Science Department, Technion, Israel; Department of Mathematics, Technion, Israel, pgs. 1-18. |
| EXAMINER | /David Garcia Cervetti/ | DATE CONSIDERED 05/22/2008 |

*EXAMINER: Initial if reference considered, whether or not citation is in conformance with MPEP 609; Draw line through citation if not in conformance and not considered. Include copy of this form with next communication to applicant.

FIG. 2A
PRIOR ART

*Claim Rejections - 35 USC § 102*

8. The following is a quotation of the appropriate paragraphs of 35 U.S.C 102 that form the basis for the rejections under this section made in this Office action: ←—16

A person shall be entitled to a patent unless- (b) the invention was patented or described in a printed publication in this or a foreign country or in public use or on sale in this country, more than one year prior to the date of application for patent in the United States.

9. Claims 1-32 are rejected under 35 U.S.C 102(b) as being anticipated by Haverinen et al. (US 2002/0012433, hereinafter Haverinen). ←—18    17

| Notice of References Cited | Application/Control No. 10/944,155 | Applicant(s)/Patent Under Reexamination ROSE ET AL. | | |
|---|---|---|---|---|
| | Examiner DAVID CERVETTI | Art Unit 2136 | Page 1 of 1 | |

U.S. PATENT DOCUMENTS

| * | | Document Number Country Code-Number-Kind Code | Date MM-YYYY | Name | Classification |
|---|---|---|---|---|---|
| * | A | US-5,455,863 A | 10-1995 | Brown et al. | 380/247 |
| * | B | US-5,689,563 A | 11-1997 | Brown et al. | 380/247 |
| * | C | US-2002/0012433 A1 | 01-2002 | Haverinen et al. | 380/247 |
| * | D | US-2002/0145051 A1 | 10-2002 | Charrin, Philipe A. | 235/492 |
| * | E | US-2002/0169966 A1 | 11-2002 | Nyman et al. | 713/182 |
| * | F | US-2003/0051140 A1 | 03-2003 | Buddhikot et al. | 713/169 |
| * | G | US-6,580,906 B2 | 06-2003 | Bilgic et al. | 455/422.1 |
| * | H | US-2004/0078571 A1 | 04-2004 | Haverinen, Henry | 713/168 |
| * | I | US-2005/0111666 A1 | 05-2005 | Blom et al. | 380/277 |
| * | J | US-2005/0189416 A1 | 09-2005 | Charrin, Philippe A. | 235/440 |
| * | K | US-2006/0143453 A1 | 06-2006 | Imamoto et al. | 713/169 |
| * | L | US-7,107,620 B2 | 09-2006 | Haverinen et al. | 726/29 |
| | M | US- | | | |

FOREIGN PATENT DOCUMENTS

| * | | Document Number Country Code-Number-Kind Code | Date MM-YYYY | Country | Name | Classification |
|---|---|---|---|---|---|---|
| | N | | | | | |
| | O | | | | | |
| | P | | | | | |
| | Q | | | | | |
| | R | | | | | |
| | S | | | | | |
| | T | | | | | |

NON-PATENT DOCUMENTS

| * | | Include as applicable: Author, Title, Date, Publisher, Edition or Volume, Pertinent Pages |
|---|---|---|
| | U | |
| | V | |

FIG. 2B
PRIOR ART

EXPEDITIOUS CITATION INDEXING

BACKGROUND

1. Field

The subject matter disclosed herein relates to citation collection and analysis systems, and more particularly to methods, apparatuses, and systems for expeditious indexing of citations listed in published patents and patent applications.

2. Information

In general, intellectual property laws in most jurisdictions require searching for, and analyzing prior art references before an invention is patented. The results of the prior art search are generally published with a granted patent. For example, in the United States, each issued patent includes a list of the references cited on the first page of the published patent. Other jurisdictions have similar procedures. Corporations and individual inventors often utilize the references cited on a published patent when performing prior art searches for a new invention. Prior art searches may also be used when trying to determine the patent landscape during new product development. The results of such prior art searches can be a gating issue in determining whether to prepare and file a patent application, or to launch a new product.

One weakness associated with this type of prior art searching is the time delay between the discovery and submission of a prior art reference, and then its appearance in a published patent. For example, in the U.S. the average pendency of a patent application is approximately 3.5 years. This delay can impact the value of the results gleaned from a prior art search. Providing a user the ability to search and analyze the citations associated with a pre-issue patent application can improve the results of a prior art search.

SUMMARY

Techniques are provided for providing expeditious citation indexing and preferably identifying relationships between cited references prior to the publication of an issued patent. For example, many jurisdictions (e.g., United States, Europe, WIPO, Japan, etc. . . . ) provide public access to patent application files (e.g., file wrappers). In general, these patent application files include electronic documents (e.g., XML, .pdf, .tiff) associated with the patent application. In most cases, a user can access the electronic documents before a patent application is published as an issued patent. Many of these electronic documents include citations to relevant prior art references. For example, in the U.S., a file wrapper may include an Information Disclosure Statement (IDS) filed by the applicant which may contain a list of relevant patent and non-patent literature. Similarly, a patent examiner may file a Form 892 document and corresponding Office Actions, which can include citations to relevant documents. Such documents are not limited to U.S. patent prosecution procedures as patent offices in other jurisdictions have similar disclosure documents.

An example of a method for expeditiously indexing patent related prior art citations according to the disclosure includes obtaining an electronic document from a patent information system, identifying a citation within the electronic document, comparing the citation to a primary trusted records list, and outputting the citation.

Implementations of such a method may include one or more of the following features. Performing an Optical Character Recognition (OCR) process on the electronic document and identifying a citation based on a result of the OCR process. Categorizing the citation into one or more predetermined categories and outputting the citation and the corresponding one or more categories. Categorizing the citation can include determining whether the citation was provided by the patent applicant, determining whether the citation was provided by the examiner, and determining whether the citation was characterized by the examiner. Calculating a first most likely candidate from the primary trusted records list. Comparing the citation to a secondary trusted records list if the first most likely candidate from the primary trusted records list cannot be calculated. Calculating a second most likely candidate from the secondary trusted records list. The primary trusted records list can include citations listed in previously granted patents and previously published patent applications An example of an apparatus for indexing patent related prior art citations according to the disclosure can include means for obtaining one or more electronic documents from a patent information system, means for identifying a citation within the one or more electronic documents, means for comparing the citation to a primary trusted records list, and means for outputting the citation.

Implementations of such a position detecting mobile device may include one or more of the following features. Means for performing an OCR process on each of the electronic documents, and means for identifying a citation based on a result of the OCR process. Means comprising categorizing the citation into one or more predetermined categories, and means for outputting the citation and the corresponding one or more categories. Means for determining whether the citation was provided by the patent applicant, whether the citation was provided by the examiner, and whether the citation was characterized by the examiner. Means for calculating a first most likely candidate from the primary trusted records list, and for comparing the citation to a secondary trusted records list if the first most likely candidate from the primary trusted records list cannot be calculated. Means for calculating a second most likely candidate from the secondary trusted records list. The primary trusted records list can include citations listed in previously granted patents and previously published patent applications.

An example of a computer-readable storage medium, having stored thereon computer-readable instructions for categorizing patent related prior art citations according to the disclosure includes instructions configured to cause at least one processor to obtain an electronic document from a patent information system, identify a citation within the electronic document, compare the citation to a primary trusted records list, and output the citation.

Implementations of such a computer-readable storage medium may include one or more of the following features. An OCR process can be performed on the electronic document, a citation can be identified based on a result of the OCR process. The citation can be categorized into one or more predetermined categories, and the citation and the corresponding one or more categories can be provided as an output. The categories can indicate whether the citation was provided by the patent applicant, whether the citation was provided by the examiner, and whether the citation was characterized by the examiner. An attempt to calculate a first most likely candidate based on the primary trusted records list can be made. The citation can be compared to a secondary trusted records list if the first most likely candidate from the primary trusted records list cannot be calculated. An attempt to calculate a second most likely candidate from the secondary trusted records list can be made. The primary trusted records list can include citations listed in previously granted patents and previously published patent applications.

An example of an apparatus for categorizing patent related prior art citations according to the disclosure includes a non-transitory computer-readable memory, a plurality of modules comprising processor executable code stored in the non-transitory computer-readable memory, a processor connected to the non-transitory computer-readable memory and configured to access the plurality of modules stored in the non-transitory computer readable memory, and a citation analysis module configured to obtain an electronic document from a patent information system, identify a citation within the electronic document, compare the citation to a primary trusted records list, and output the citation.

Implementations of such an apparatus may include one or more of the following features. The citation analysis module can be configured to perform an OCR process on the electronic document, and identify a citation based on a result of the OCR process. A citation can be categorized into one or more predetermined categories, and the citation and the corresponding one or more categories can be presented as an output. Determinations can be made as to whether the citation was provided by the patent applicant, whether the citation was provided by the examiner, and whether the citation was characterized by the examiner. The citation analysis module can be configured to calculate a first most likely candidate from the primary trusted records list, and to compare the citation to a secondary trusted records list if the first most likely candidate from the primary trusted records list cannot be calculated. A second most likely candidate can be calculated from the secondary trusted records list. The primary trusted records list can include citations listed in previously granted patents and previously published patent applications.

BRIEF DESCRIPTION OF THE FIGURES

FIG. 1 is a portion of an exemplary published United States patent with a list of references cited.

FIG. 2A is a portion of an exemplary Information Disclosure Statement filed by an applicant for a United States patent application.

FIG. 2B is a portion of an Office Action and corresponding Form 892 filed by an examiner in a United States patent application.

DETAILED DESCRIPTION

Figure 2C:
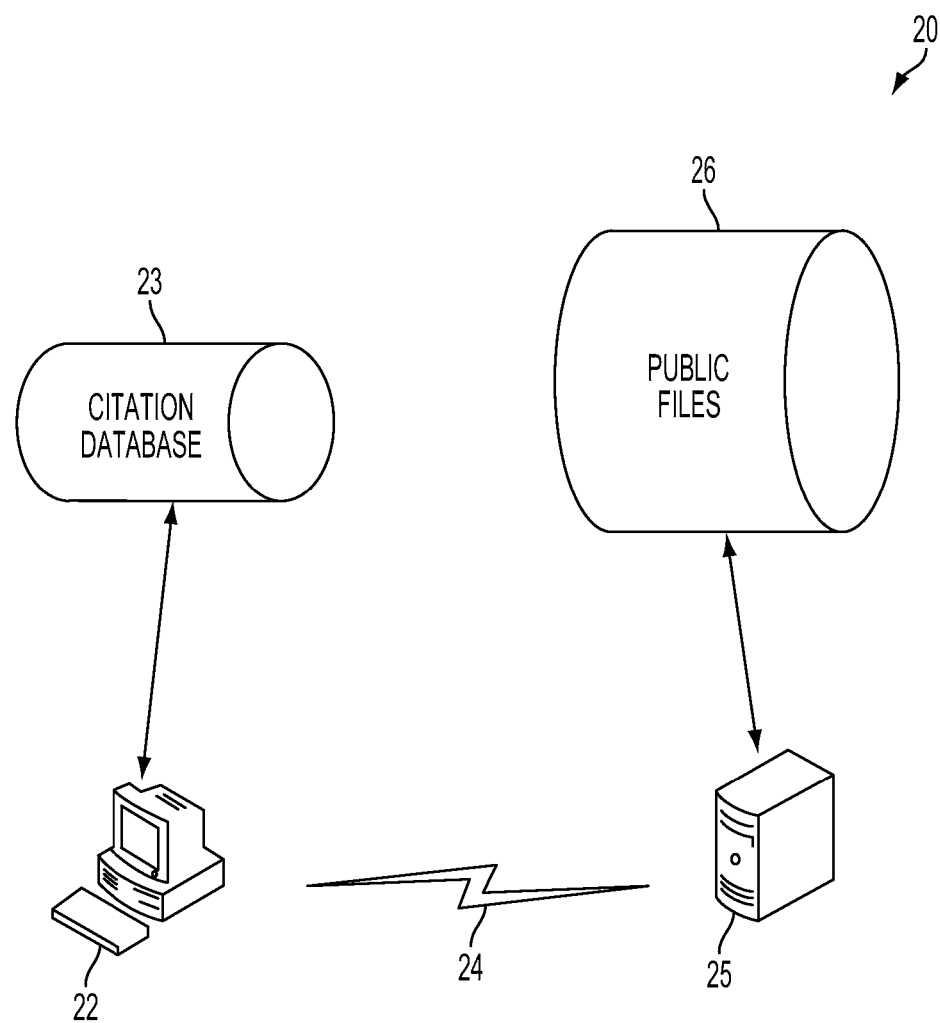
FIG. 2C is a systems diagram of computer network configured to generate expeditious citation indexing.

Implementations relating to techniques for performing expeditious citation indexing are disclosed. The methods, apparatuses, and systems are exemplary, however, and not limiting of the invention as other implementations in accordance with the disclosure are possible. For example, while examples are made to processes and procedures at the United States Patent and Trademark Office (USPTO), the techniques herein can be used with the infrastructure provided by other patent offices in other countries.

Referring to FIG. 1, a portion of an exemplary published United States Patent 10 with a list of cited references 12 is shown. The U.S. patent 10 is exemplary only, and not limitation, as other patents and patent applications in other jurisdictions may also be used. A typical patent 10 includes a list of references cited 12 which can contain citations to other U.S. patents (for example), foreign patent documents, and other publications. In general, the individual references in the list 12 are provided to the USPTO by the applicant via an IDS or by the examiner via a Form 892. In some circumstances, a third party can also provide references which may be included in the list 12.

Referring to FIG. 2A, an exemplary IDS 14 is shown. In the USPTO, an IDS can include citations relating to U.S. patent documents, foreign patent documents, and other non-patent literature. The citation information can be displayed in several fields contained on the IDS. For example, the fields associated with each of the citations can include a document number, a date, a name, an author, and the title. In general, these fields comply with standard formatting. In an embodiment, an expeditious citation indexing system can be configured to parse, or otherwise recognize, the citations contained in an IDS based at least in part on the expected formatting.

Referring to FIG. 2B, with further reference to FIG. 1, a portion of an Office Action 16 and corresponding Form 892 17 filed by an examiner in a United States patent application are shown. In general, when a patent examiner conducts a prior art search, the references they discover can be included in the file wrapper. For example, in the U.S. a patent examiner will fill out a Form 892 which will contain a list of prior art the examiner believes is relevant. This list of citations is included in the list of cited references 12 in a published U.S. patent. Some of the references listed on the form 892 may also be cited in the office action 16 as the basis of a rejection. In general, when an examiner rejects the claim submitted by an applicant they will provide context for the rejection such as indicating a statutory reason and listing one or more prior art references 18. Typically, in the U.S., the prior art references are identified by the name of the first inventor and the patent number or publication number of the reference. Other documents may also be cited such as non-patent literature which can be referenced by an author named and/or the title of the article, and the publication date. The procedures used in the United States Patent and Trademark Office are exemplary only, and not a limitation, as similar procedures are used in other jurisdictions.

Referring to FIG. 2C a systems diagram of a computer network 20 configured to generate expeditious citation indexing is shown. In an embodiment, a system 20 configured to generate expeditious citation indexing can include a computer system 22 and a citation database 23. The computer system 22 and/or the citation database 23 can be in communication (e.g., with a communications link 24) with a patent office information system 25 and a database 26 of public files. For example, a computer 22 can communicate via the Internet with a patent office information system 25 (e.g., USPTO, WIPO, EPO, JPO, etc. . . . ), and thereby gain access to public documents associated with patent applications which are stored in the public files database 26. The citation database can be a relational database (e.g., SQL, Oracle), or other flat file storage configuration (e.g., XML). The computer network 20 is exemplary only, and not a limitation, as other configurations may be used to access public documents associated with patent applications.

Figure 3:
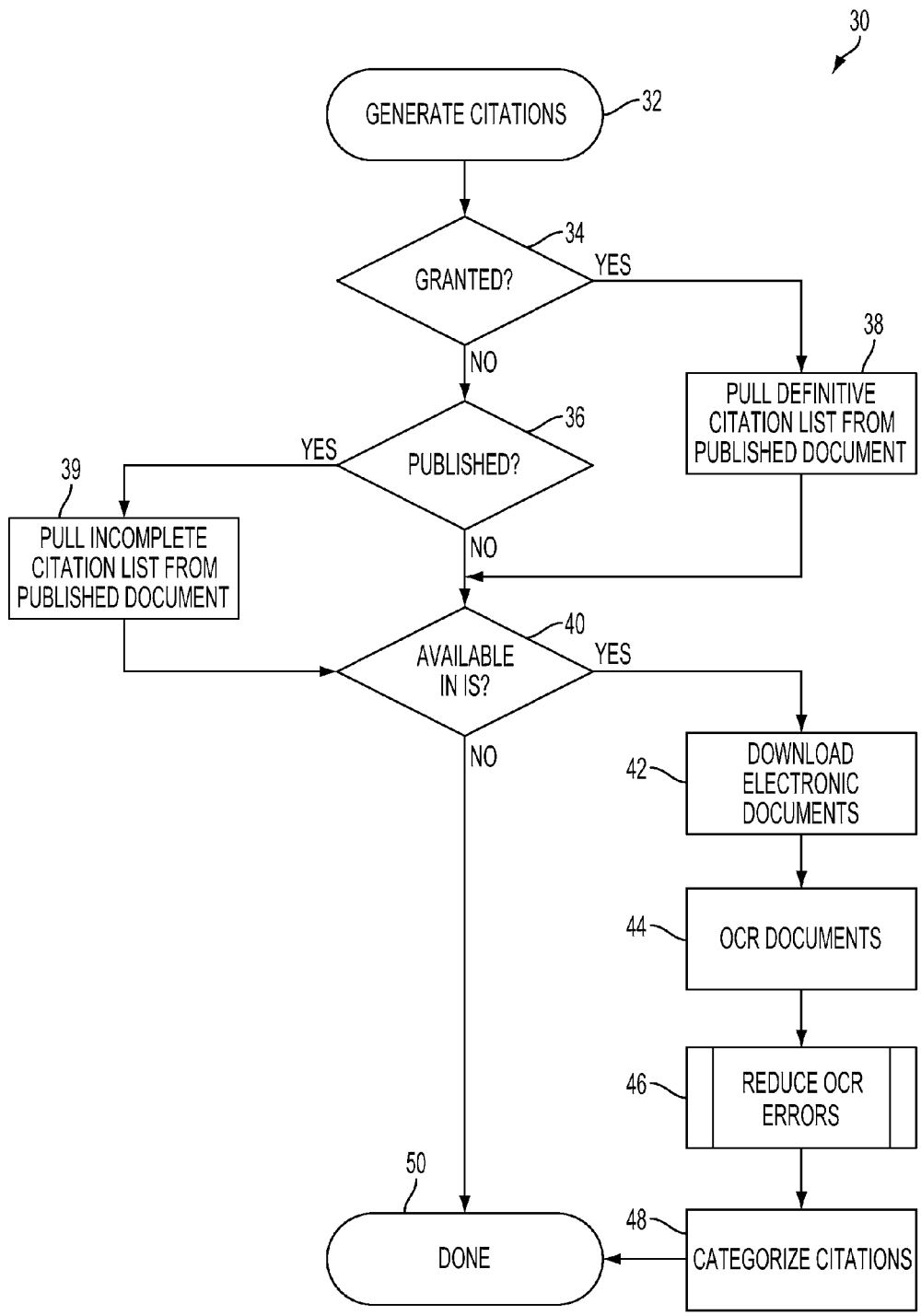
FIG. 3 is an exemplary process for categorizing citations.

In operation, referring to FIG. 3, with further reference to FIG. 2C, a process 30 for categorizing citations using the system 20 includes the stages shown. The process 30, however, is exemplary only and not limiting. The process 30 may be altered, e.g., by having stages added, removed, or rearranged. The process 30 can be implemented as a citation analysis module within the computer 22.

At stage 32, a user can utilize a computer 22 to enter a citation of interest. For example, the user can enter a citation such as a patent number, an application number, or a publication number, and the computer will connect with the information system 25 in an effort to retrieve information associated with the user's input. In an embodiment, the process 30 can be part of a recursive system such that the citations that are produced during a first iteration of the process 30 can be used as the input to subsequent iterations of the process 30. At stage 34, the computer 22 can receive information via a network 24 which will indicate whether or not the entered citation is associated with a granted patent. If the citation is a granted patent, a definitive citation list can be determined at stage 38. For example, in the U.S., the definitive citation lists can be the list of references 12 that are included on the face of the published patent. The list of references 12 can be obtained through an Optical Character Recognition (OCR) process on an electronic file (e.g., a .pdf, .tiff), or the list may be available from the information system 25 via an XML or HTML file. If the entered citation is not a granted patent, then a determination on whether the citation is a published application is made at stage 36. In some jurisdictions, an incomplete citation list is provided with published applications. At stage 39, the available citations can be obtained via an OCR process, or through an electronic transfer from the information system 25. In an embodiment, third party databases (e.g., Google Patent, Dialog, Digipat) can be utilized to retrieve citation lists from published documents. In some implementations, the OCR process may not be required if the electronic documents are available via other electronic formats (e.g., XML, HTML).

At stage 40, a determination is made based on the availability of public documents in the information system 25. If electronic documents are not available in the information system 25 then the process can complete at stage 50. Otherwise, the documents that are available in the information system 25 can be downloaded at stage 42. For example, in the U.S. information disclosure statements, form 892, and office actions can be downloaded via the Patent Application Information Retrieval (PAIR) system. Similar documents can be downloaded from other information systems 25 in other jurisdictions. In an embodiment, the downloaded documents can persist in a database, or other file server, for subsequent processing. The downloaded documents can be stored in a memory cache and deleted after analysis. Some information systems 25 include citation information in an XML format, or other text based format, which can be readily processed by the computer 20. Other information systems 25 (e.g., PAIR) include images of documents (i.e., .pdf files) which require additional processing to recognize the citation information. An algorithm for obtaining electronic documents can include the steps of logging onto the information system, using a mechanical turk to solve a security query such as a Captcha window (if necessary), entering a patent number (or publication number), selecting all documents in the file wrapper, and downloading the electronic files to a storage medium. Other algorithms may also be used.

At stage 44, an OCR analysis can be performed on some or all of the downloaded documents. For example, citations listed in the documents can be recognized and stored. Other information such as included in the bibliography section, assignment information, and in the rest of the file wrapper can be stored. For example, the information can be stored in a relational database and associated with one or more citations. Office actions can be analyzed to determine the context of a citation. The context of a citation can include the relevant statute a prior reference is cited under (i.e., cited under 35 U.S.C. 102/103), and the other references used in a combination under 35 U.S.C. 103. The claims to which a citation applies can be stored and associated with the citation. In an embodiment, an algorithm for performing the initial OCR analysis can include making a program call to an automated forms processing software such as ReadSoft®. The results of the initial OCR process can be provided to a subsystem to help reduce the OCR errors at stage 46. In general, a process for reducing OCR errors can include cross-referencing the OCR results with previously stored citations in the database 23. Other error checking and validation processes can be used. For example, the results of an OCR process can be compared to citation formatting standards to help improve the recognition results. An exemplary error reduction algorithm is provided at FIG. 4 and discussed below.

At stage 48, the citations detected in the OCR process can be categorized. In general, the number and nature of the categories can change based on the needs of the user. As an example, and not a limitation, the citations can be categorized into groups such as: cited by applicant in original draft; cited by applicant prior to allowance; cited by application post allowance; cited by examiner; cited by examiner in relation to rejection; and the number of times/number of documents each citation is listed. Categories can help a user explore correlations within the citation database 23. For example, a particular citation may appear in several records in the citation database 25 as being cited by an examiner. The correlation may indicate that a particular examiner uses a particular citation with a high frequency. Knowing the frequency with which a particular reference is cited can help a user better understand the scope of the prior art. An algorithm for categorizing a citation can include identifying the form and the relative location of the information on the form. For example, if a citation is included on a form 892, or in an Office Action, then the algorithm sets a category field to "cited by examiner" In an example, the context of a citation provided in a document can be used to categorize the citation (e.g., statutory relevance such as novelty, obviousness, inventive step, industrial applicability). Other entries for one or more category fields can be set with similar logic.

At stage 50, the process 30 can be completed. In an embodiment the citations and corresponding categories can be output to the citation database 23 for storage and subsequent retrieval. The output at stage 50 can be directed to a monitor or printer for immediate review by a user. The output may be used by another application for subsequent processing. An algorithm for outputting a citation and corresponding categories can include passing the data to a database application (e.g., via an append query), or transforming the data with XML tags. In a simple example, the output algorithm can include a simple print command to print the data on a monitor or printer.

Figure 4:
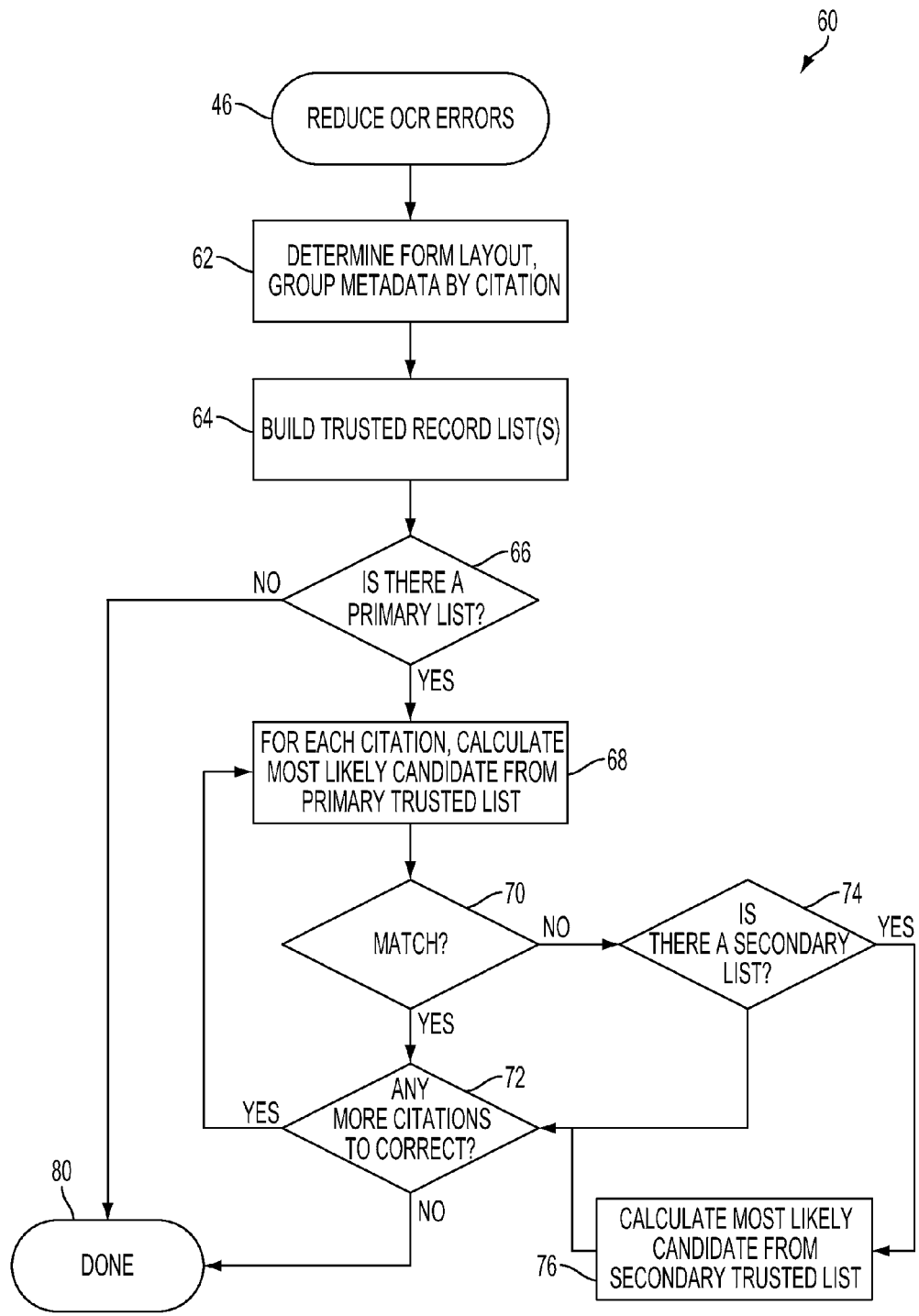
FIG. 4 is an exemplary process for reducing OCR errors associated with prior art citations.

Referring to FIG. 4, with further reference to FIG. 3, an exemplary process 60 for reducing OCR errors associated with prior art citations is shown. The process 60, however, is exemplary only and not limiting. The process 60 may be altered, e.g., by having stages added, removed, or rearranged. As described in relation to FIG. 3, stage 46 can include the process 60. In general, the downloaded electronic documents include various pieces of information that can be utilized to categorize a citation (e.g., bibliographic data, context, citation text). At stage 62, the form layout and group metadata for each citation can be determined. For example, the location of a document number on an IDS or form 892 can indicated whether a number is associated with an issued patent or publication. The document numbers can be parsed based on the expected formatting. For example, many of the fields have known format (i.e., patent numbers contain 7 digits). Errors could be identified where a field is not of known format. At stage 64, citations with a high degree of trust (i.e., based on published information) can be stored on the citations database 23 as a primary list. For example, information received via an XML file transfer can have a higher level of trust as compared to information obtained through an OCR process. In an embodiment, a verification process can be used to increase the level of trust for OCR based information. The information obtained through an OCR process can be compared to a primary trusted records list (if such a primary list exists, which can be determined at stage 66). An algorithm for comparing a citation to a primary records list can include searching a database for a data value which corresponds to the citation. A most likely candidate can be calculated at stage 68. For example, if a citation document number and the date of application do not match an entry in the primary list, then single character errors may be identified. As an example, if a patent number of 5,341,338 is in the primary list, but the date listed in the document is the issue date for patent 5,341,339, and the applicant matches patent 5,341,339, the it is likely the citation is for 5,341,339. Thus, at stage 70 a match could be returned. Errors could be in any of the information fields, not just the patent number field. For example, if Examiner "John Smith" at Art Unit 3434 is in the primary list, but primary list does not contain a record for Examiner "John Smit" in Art Unit 3434, then the most likely candidate for an OCR result of "John Smit" is "John Smith."

In an embodiment, if a most likely candidate from the primary trusted list cannot be calculated then at stage 70 a determination is made that a match does not exist. A determination on whether or not a secondary list exists is then made at stage 74. A citation that was not matched at stage 70 can be provided as the input to stage 76. A likely candidate can be computed based on the secondary trusted list at stage 76 in a manner as described above. For example, a secondary list could be generated based on redundant documents such as looking at multiple office actions and/or 892 forms in a single application file. If there are more citations to correct at stage 72, the process can iterate back to stage 68. Otherwise, process ends at stage 80.

Figure 5:
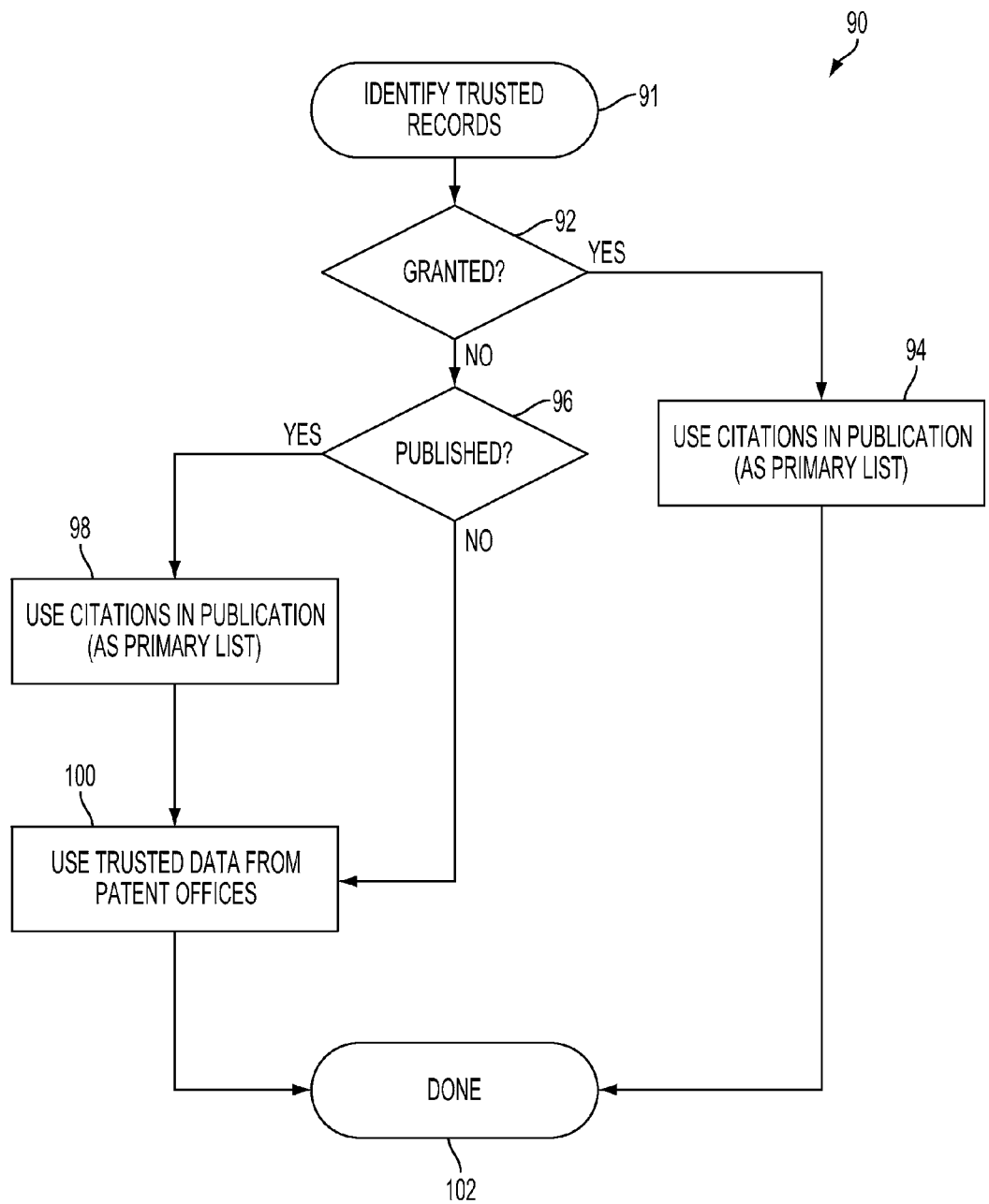
FIG. 5 is an exemplary process for identifying trusted records.

In operation, referring to FIG. 5, with further reference to FIG. 4, a process 90 for identifying trusted records using the system 20 includes the stages shown. The process 90, however, is exemplary only and not limiting. The process 90 may be altered, e.g., by having stages added, removed, or rearranged. In an embodiment, stage 91 can be used to build a primary list of trusted records for use in the process 60 at stage 64. At stage 92 a determination is made on whether a particular citation is associated with a granted patent. If so, then the citations provided in the granted patent (e.g., reference list 12) can be added to the primary list. At stage 96, a determination is made regarding a published application and the associated published citations. If citations are available, they can be added to the primary list at stage 98. Other trusted data, such as received via XML or other text based format, may be considered trusted at stage 100 since it is not dependent on an OCR process. The process can terminate at stage 102.

Figure 6:
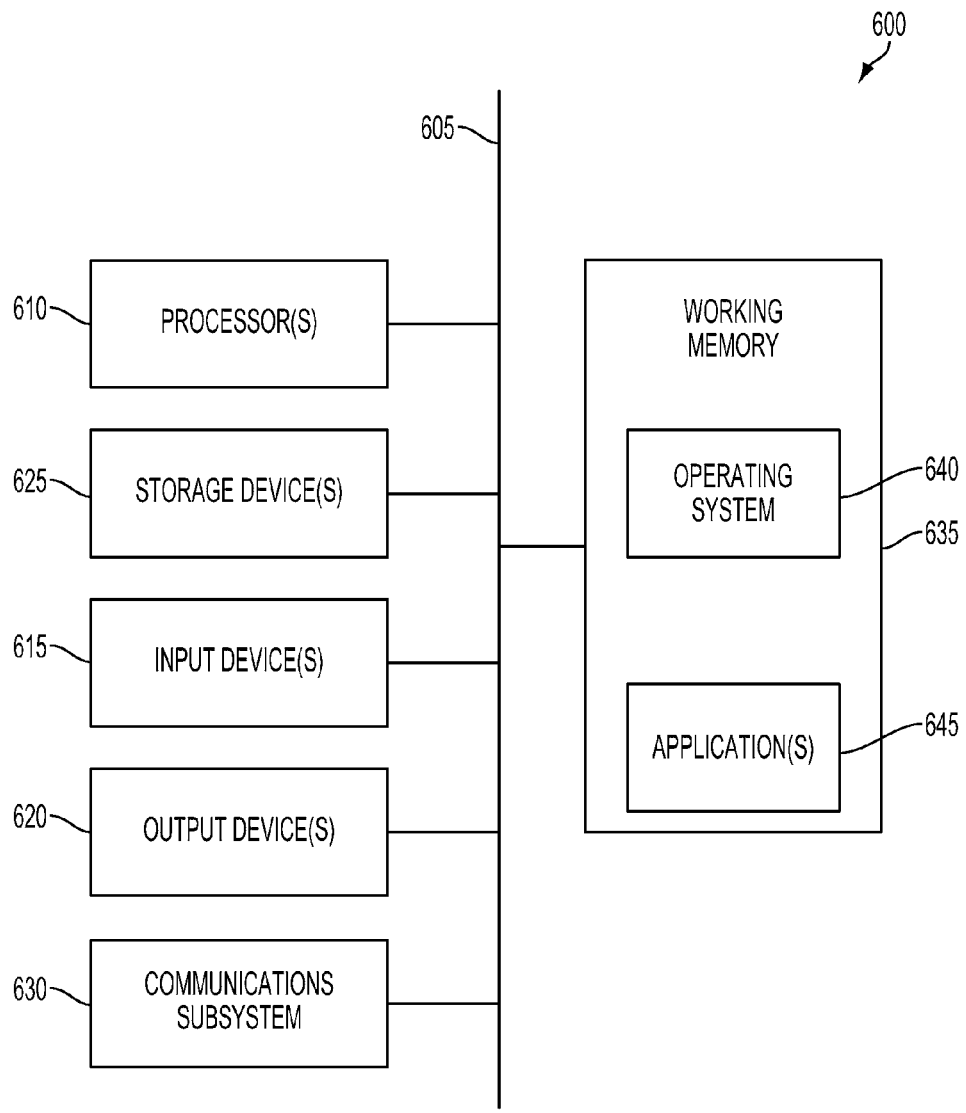
FIG. 6 illustrates a block diagram of an example of a computer system.

Referring to FIG. 6, with further reference to FIGS. 2C-5, a computer system 600 as illustrated may incorporate as part of the previously described computerized devices. FIG. 6 provides a schematic illustration of one embodiment of a computer system 600 that can perform the methods provided by various other embodiments, as described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for expeditiously indexing patent related prior art citations, the method comprising:
    obtaining, by a computer, an electronic document from a patent information system;
    performing, with the computer, an Optical Character Recognition (OCR) process on the electronic document;
    identifying, with the computer, a plurality of citation fields within the electronic document based on a result of the OCR process;
    calculating, with the computer, a most likely candidate, wherein an algorithm for calculating the most likely candidate includes:
        comparing the plurality of citation fields to a primary trusted records list, wherein the primary trusted records list consists of a database of trusted data received via a text based format from the patent information system;
        returning a matching record in the primary trusted records list based on the plurality of citation fields;
        setting the most likely candidate to the matching record;
    categorizing the most likely candidate into one or more predetermined categories, wherein categorizing includes determining whether the most likely candidate was provided by a patent applicant or an examiner; and
    outputting the most likely candidate and a corresponding one or more categories.

2. The method of claim 1 wherein categorizing the most likely candidate includes determining whether the most likely candidate was characterized by the examiner.

3. The method of claim 1 further comprising:
    comparing, with the computer, the plurality of citation fields to a secondary trusted records list to calculate a second most likely candidate if the most likely candidate cannot be calculated, wherein the secondary trusted records list is generated based on redundant documents in a single application file within the patent information system; and
    outputting the second most likely candidate.

4. An apparatus for indexing patent related prior art citations, comprising:
    means for obtaining one or more electronic documents from a patent information system;
    means for performing an Optical Character Recognition (OCR) process on the one or more electronic documents;
    means for identifying a plurality of citation fields within the one or more electronic documents based on a result of the OCR process;
    means for calculating a most likely candidate including:
        means for comparing the plurality of citation fields to a primary trusted records list, wherein the primary trusted records list consist of a database of trusted data received via a text based format from the patent information system;
        means for returning a matching record in the primary trusted records list based on the plurality of citation fields;
        means for setting the most likely candidate to the matching record;
    means for categorizing the most likely candidate into one or more predetermined categories, wherein categorizing includes determining whether the most likely candidate was provided by a patent applicant or an examiner; and
    means for outputting the most likely candidate and a corresponding one or more categories.

5. The apparatus of claim 4 wherein the means for categorizing the most likely candidate includes means for determining whether the most likely candidate was characterized by the examiner.

6. The apparatus of claim 4 comprising:
    means for comparing the plurality of citation fields to a secondary trusted records list to calculate a second most likely candidate if the most likely candidate cannot be calculated, wherein the secondary trusted records list is generated based on redundant documents in a single application file within the patent information system; and
    means for outputting the second most likely candidate.

7. A computer-readable storage medium, having stored thereon computer-readable instructions for categorizing patent related prior art citations, comprising instructions configured to cause at least one processor to:
    obtain an electronic document from a patent information system;
    perform an Optical Character Recognition (OCR) process on the electronic document;
    identify a plurality of citation fields within the electronic document based on a result of the OCR process;
    calculate a most likely candidate, including instructions configured to cause the at least one processor to:
        compare the plurality of citation fields to a primary trusted records list, wherein the primary trusted records list consists of a database of trusted data received via a text based format from the patent information system;
        return a matching record in the primary trusted records list based on the plurality of citation fields;
        set the most likely candidate to the matching record;
    categorize the most likely candidate into one or more predetermined categories, including instructions configured to cause the at least one processor to determine whether the most likely candidate was provided by a patent applicant or an examiner; and
    output the most likely candidate and a corresponding one or more categories.

8. The computer-readable storage medium of claim 7 wherein the instructions configured to cause the at least one processor to categorize the most likely candidate includes instructions configured to cause the at least one processor to determine whether the most likely candidate was characterized by the examiner.

9. The computer-readable storage medium of claim 7 wherein the instructions are further configured to cause the at least one processor to:
    compare the plurality of citation fields to a secondary trusted records list to calculate a second most likely candidate if the most likely candidate cannot be calculated, wherein the secondary trusted records list is generated based on redundant documents in a single application file_within the patent information system; and
    output the second most likely candidate.

10. An apparatus for categorizing patent related prior art citations, comprising:
    a non-transitory computer-readable memory;
    a plurality of modules comprising processor executable code stored in the non-transitory computer-readable memory;
    a processor connected to the non-transitory computer-readable memory and configured to access the plurality of modules stored in the non-transitory computer-readable memory; and a citation analysis module configured to
obtain an electronic document from a patent information system;
perform an Optical Character Recognition (OCR) process on the electronic document;
identify a plurality of citation fields within the electronic document based on a result of the OCR process;
calculate a most likely candidate, the citation analysis module further configured to:
compare comparing the plurality of citation fields to a primary trusted records list, wherein the primary trusted records list consists of a database of trusted data received via a text based format from the patent information system;
return a matching record in the primary trusted records list based on the plurality of citation fields;
set the most likely candidate to the matching record;
categorize the most likely candidate into one or more predetermined categories, including instructions configured to cause the processor to determine whether the most likely candidate was provided by a patent applicant or an examiner; and
output the most likely candidate and a corresponding one or more categories.

11. The apparatus of claim 10 wherein the citation analysis module is configured to determine whether the most likely candidate was characterized by the examiner.

12. The apparatus of claim 10 wherein the citation analysis module is configured to:
compare the plurality of citation fields to a secondary trusted records list to calculate a second most likely candidate if the most likely candidate cannot be calculated, wherein the secondary trusted records list is generated based on redundant documents in a single application file within the patent information system; and
output the second most likely candidate.

* * * * *